US012768938B2

(12) United States Patent
Deisch et al.

(10) Patent No.: US 12,768,938 B2
(45) Date of Patent: Oct. 20, 2026

(54) MOTORCYCLE RADAR SYSTEM

(71) Applicant: Garmin International, Inc., Olathe, KS (US)

(72) Inventors: Daniel J. Deisch, Olathe, KS (US); Paulus J. van der Merwe, Stellenbosch (ZA); Joshua L. Sendall, Stellenbosch (ZA); Jeff D. Taylor, Olathe, KS (US); Donald J. Schmidt, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 191 days.

(21) Appl. No.: 18/585,207

(22) Filed: Feb. 23, 2024

(65) Prior Publication Data

US 2024/0288535 A1 Aug. 29, 2024

Related U.S. Application Data

(60) Provisional application No. 63/486,817, filed on Feb. 24, 2023.

(51) Int. Cl.

*G01S 7/10* (2006.01)
*G01S 7/03* (2006.01)
*G01S 7/06* (2006.01)
*G01S 13/931* (2020.01)

(52) U.S. Cl.

CPC .................................... *G01S 7/10* (2013.01); *G01S 7/03* (2013.01); *G01S 7/062* (2013.01); *G01S 13/931* (2013.01); *G01S 2013/9315* (2020.01)

(58) Field of Classification Search

CPC ... G01S 7/10; G01S 7/03; G01S 7/062; G01S 13/931; G01S 2013/9315

See application file for complete search history.

(56) References Cited

U.S. PATENT DOCUMENTS

| | | | | |
|---|---|---|---|---|
| 7,852,462 | B2 | 12/2010 | Breed et al. | |
| 10,393,872 | B2 | 8/2019 | Brisimitzakis et al. | |
| 10,527,722 | B2 | 1/2020 | Carlson et al. | |
| 2010/0066833 | A1 | 3/2010 | Ohshima et al. | |
| 2017/0101056 | A1* | 4/2017 | Park | B60Q 1/085 |
| 2017/0160392 | A1* | 6/2017 | Brisimitzakis | G01S 7/24 |
| 2020/0191952 | A1* | 6/2020 | Makinen | G01S 7/003 |
| 2020/0361370 | A1* | 11/2020 | Wescott | B60Q 1/0023 |
| 2021/0221368 | A1* | 7/2021 | Lavi | B60K 35/22 |
| 2021/0339699 | A1* | 11/2021 | Adams | B60R 21/34 |
| 2023/0098779 | A1* | 3/2023 | Mankowski | G06V 20/58 340/425.5 |

OTHER PUBLICATIONS

Printout from https://www.ducati.com/us/en/accessories/ACC012213, published prior to Feb. 23, 2024.

(Continued)

*Primary Examiner* — Nazra Nur Waheed

(74) *Attorney, Agent, or Firm* — Samuel M. Korte; Kathleen D. Fitterling

(57) ABSTRACT

A motorcycle radar system can include a radar sensor, a wireless interface, and an electronic device such as a smartphone or navigation device. The electronic device can receive radar data from the wireless interface of the radar sensor and present information on its display including a top view of the motorcycle and one or more vehicles proximate the motorcycle.

12 Claims, 7 Drawing Sheets

(56) References Cited

OTHER PUBLICATIONS

Printout from https://innovv.co.uk/shop/motorcycle-radar-system/motorcycle-radar/published prior to Feb. 22, 2024.
Screenshot from https://www.youtube.com/watch?app=desktop&v=cy0603N_f1Y&ab_channel=KiWAV.com published prior to Feb. 22, 2024.

* cited by examiner

MOTORCYCLE RADAR SYSTEM

RELATED APPLICATIONS

This application claims priority to U.S. provisional application No. 63/486,817 filed Feb. 24, 2023, the contents of which are hereby incorporated by reference herein for all purposes.

BACKGROUND

Blind-spot detection and collision alert systems are often used on vehicles, including motorcycles, to warn drivers of nearby vehicles that may present a risk.

BRIEF DESCRIPTION OF THE DRAWINGS

The detailed description references the accompanying figures. The use of the same reference numbers in different instances in the description and the figures may indicate similar or identical items. In addition, the proportion and the relative scale of the elements provided in the figures are intended to illustrate various embodiments of the present disclosure and are not to be used in a limiting sense.

DETAILED DESCRIPTION

Figure 1A:
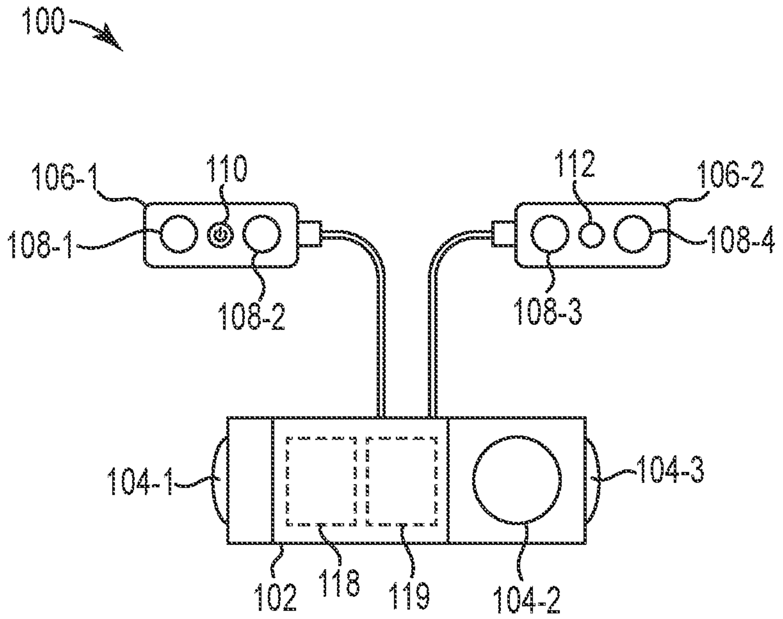
FIG. 1A illustrates an example of a motorcycle radar system.

The present disclosure includes a motorcycle radar system. The motorcycle radar system can comprise a radar sensor and a number of indicator lights. The radar sensor can be coupled to a motorcycle and can transmit radar signals and receive radar returns to detect a number of vehicles within a particular distance of the motorcycle. The number of indicator lights can be removably coupled to a handlebar or other parts of the motorcycle and communicatively coupled to the radar sensor. The number of indicator lights can emit light based on the detection of the number of vehicles.

Conventional blind-spot detection systems often must be originally equipped during manufacture of a vehicle. And, although aftermarket systems do exist, these systems are often bulky with poor user interfaces that provide limited value to the rider.

The motorcycle radar system disclosed herein offers enhanced functionality to the rider and nearby vehicles. For example, the motorcycle radar system enables a rider to be more aware of their surroundings while also helping the rider be seen by other vehicles. The motorcycle radar system can utilize 76-81 gigahertz (GHz) radar, and/or other frequency bands, to track a direction and a relative speed of one or more vehicles within a particular area surrounding the motorcycle.

The radar sensor of the motorcycle radar system can be incorporated into a radar housing (e.g., radar module) that can be coupled to the motorcycle. In a number of embodiments, the radar housing can be mounted to the rear of a motorcycle. The radar housing can include a number of road lights to alert surrounding vehicles of the presence of the motorcycle. For example, the radar housing may include three road lights, one rear facing red road light and two side facing amber road lights.

The motorcycle radar system may also include an indicator. In various embodiments, the indicator can be coupled to one or both handlebars of the motorcycle or other suitable locations for viewing by the user. The indicator can be and/or include the number of indicator lights facing the rider for heads-up visual cues indicating the positions of nearby vehicles. Thus, the motorcycle radar system may function and provide alerts to the rider and warnings to drivers of nearby vehicles, even if it is not paired with another device such as a personal (GPS) navigation device, smartphone, smartwatch, or the like. However, the motorcycle radar system may interface with other devices and displays to present the alerts to the rider or additional situational information to the rider.

In various embodiments, the motorcycle radar system may additionally include one or more cameras. The one or more cameras may be integrated into the radar housing or be disposed in their own housing. In some configurations, the camera can be used to record vehicles around the motorcycle (e.g., in front of, beside, and/or behind the motorcycle) and generate information including a relative speed and/or direction of a vehicle to enhance the situational awareness provided to the rider. For example, computer vision techniques may be used on images generated by the camera to identify a presence of a vehicle for comparison to radar returns to reduce false alerts.

Lane data and other positional information may also be generated from the images to assist in more precise warnings. For example, the rider may be presented a graphic via a display showing the rider's current lane, a relative speed, direction, or location of nearby vehicles, the type of nearby vehicles (e.g., truck, car, motorcycle), and/or their respective lanes. Additional alerts may be generated and conveyed if a nearby vehicle is crossing lane lines towards the rider or otherwise maneuvering towards the rider.

FIG. 1A illustrates an example of motorcycle radar system 100. The motorcycle radar system 100 can be an aftermarket system configured to be coupled to a motorcycle after the motorcycle has been assembled. The motorcycle radar system 100 is operable to transmit radar signals, receive radar returns to detect a number of vehicles within a particular distance of the motorcycle, and/or convey the detection of the number of vehicles to a rider of the motorcycle.

As illustrated in FIG. 1A, motorcycle radar system 100 includes a radar housing 102 and a number of indicators 106-1, 106-2. However, in a number of embodiments, the motorcycle radar system 100 can include the radar housing 102 without the number of indicators 106-1, 106-2.

The radar housing 102 can be coupled to a part towards a rear of the motorcycle. For example, the radar housing 102 can be coupled to a license plate, a seat, a rear fender, or a rear fairing of the motorcycle.

The radar housing 102 can include a number of road lights 104-1, 104-2, 104-3 and a radar sensor 118 configured to transmit radar signals and receive radar returns to detect a number of vehicles within a particular distance of the motorcycle. The radar sensor 118 can determine a relative speed, direction, and/or size of one or more of the number of vehicles based on the radar returns.

The number of road lights 104-1, 104-2, 104-3 can be communicatively coupled to the radar sensor 118 wired or wirelessly. Light can be emitted by one or more of the number of road lights 104-1, 104-2, 104-3 based on the detection of the number of vehicles. For example, road light 104-2 can emit a first color outwardly from a rear of the motorcycle, road light 104-1 can emit a second color outwardly from a first side of the motorcycle, and road light 104-3 can emit the second color outwardly from a second side of the motorcycle. In a number of embodiments, the first color can be red and the second color can be amber.

The number of indicators 106-1, 106-2 can be communicatively coupled to the radar sensor 118. The number of indicators 106-1, 106-2 can convey information to a rider of the motorcycle based on the radar returns. For example, the number of indicators 106-1, 106-2 can be used to provide a visual alert to the rider. The number of indicators 106-1, 106-2 can be and/or include a number of indicator lights 108-1, 108-2, 108-3, 108-4, a navigation device, a smartphone, a smartwatch, a wearable device, a display, a helmet-mounted display, or a head-up display. The number of indicators 106-1, 106-2 can use any number of lights, combination of lights, audio, and/or tactile warnings to alert the rider of nearby traffic. For example, the number of indicator lights 108-1, 108-2, 108-3, 108-4 can be removably coupled to a handlebar of the motorcycle or other suitable areas, communicatively coupled to the radar sensor, and emit light based on the detection of the number of vehicles. The indicators 106 and/or indicator lights 108 may be equipped with mounting elements, such as screws, zip ties, mounting brackets, adhesives, and the like, for mounting on the motorcycle in any location.

One or more of the number of indicators 106-1, 106-2 can further include a button 110 and a status light 112 that can be removably coupled to the handlebar of the motorcycle. The button 110 can be operable to turn the motorcycle radar system 100 on and/or off and the status light 112 can convey to the rider of the motorcycle whether the motorcycle radar system 100 is on and/or off. For example, the status light 112 can emit light or emit a particular color light when the motorcycle radar system 100 is on and/or cease to emit light or emit a different particular color light when the motorcycle radar system 100 is off. In a number of embodiments, the status light 112 can emit a green light when the motorcycle radar system 100 is turned on.

The motorcycle radar system 100 can further include a camera 119. The camera 119 can be coupled to the motorcycle via the radar housing 102 or independently from the radar housing 102. The camera 119 can generate and transmit video data. The camera 119 can be communicatively coupled to the radar sensor 118 such that the camera 119 can transmit video data to the radar sensor 118. A relative speed and/or direction of one or more of the number of vehicles can be determined based on the video data. For example, the camera 119 and/or the radar sensor 118 can use a frame rate and pixel size of the camera 119 to determine the relative speed and/or direction of one or more of the number of vehicles.

Figure 1B:
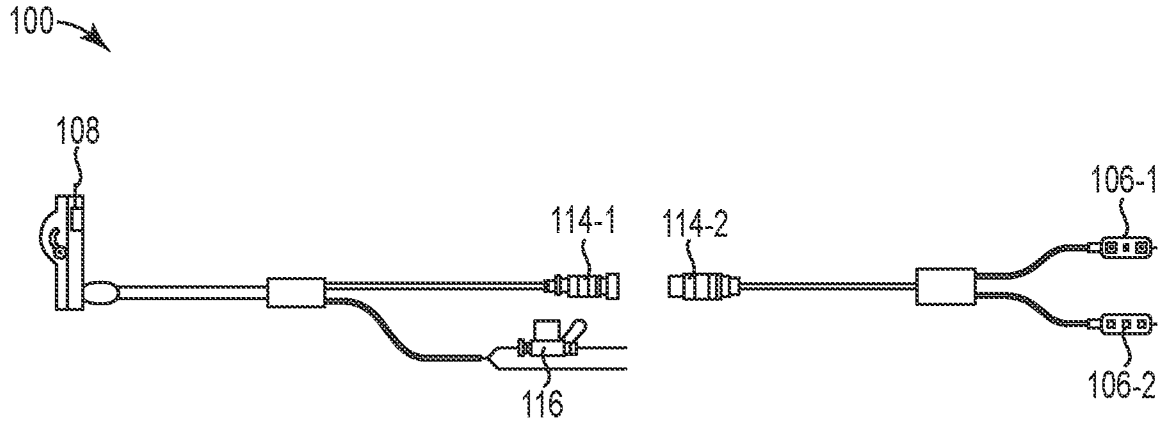
FIG. 1B illustrates an example of a motorcycle radar system.

FIG. 1B illustrates an example of motorcycle radar system 100. As previously discussed in connection with FIG. 1A, the motorcycle radar system 100 can include a number of indicators 106-1, 106-2. The motorcycle radar system 100 can further include a power source and/or ground input 116. In some examples, the radar housing 102 can be coupled to the indicators 106-1, 106-2 via connectors 114-1, 114-2.

Figure 2:
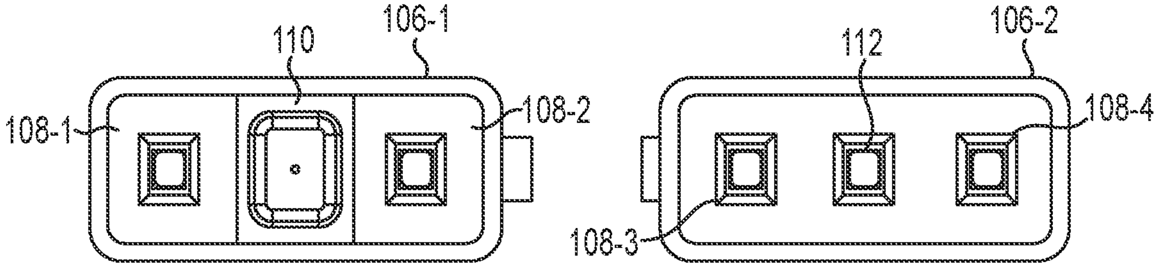
FIG. 2 illustrates an example of indicators of a motorcycle radar system.

FIG. 2 illustrates an example of indicators 106-1, 106-2. As previously described in connection with FIG. 1A, the indicators 106-1, 106-2 can include a number of indicator lights 108-1, 108-2, 108-3, 108-4, a button 110, and a status light 112. In a number of embodiments, indicator 106-1 can include indicator light 108-1, indicator light 108-2, and the button 110 and indicator 106-2 can include indicator light 108-3, indicator light 108-4, and status light 112, as illustrated in FIG. 2. The number of indicator lights 108-1, 108-2, 108-3, 108-4 can be one or more red lights and/or one or more amber lights. In some configurations, the indicator lights 108 may be configured to display other colors or multi-color presentations.

Figure 3A:
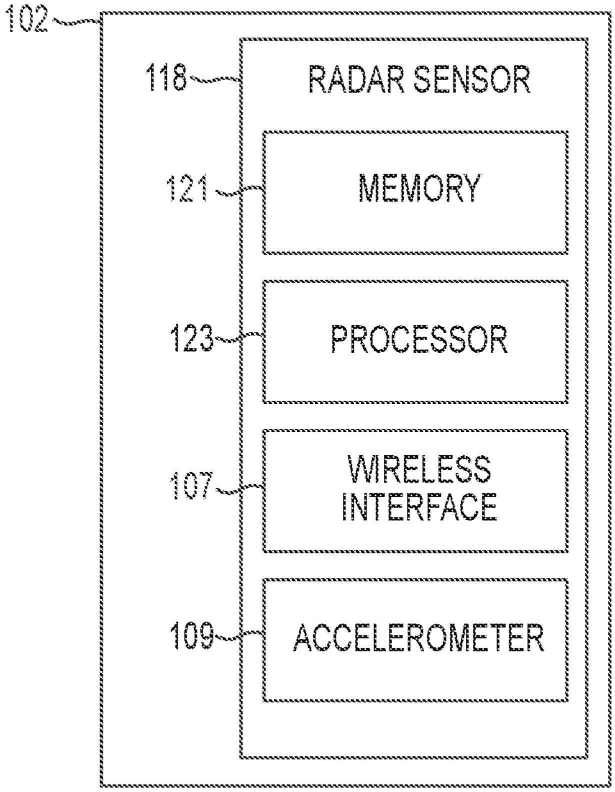
FIG. 3A is a block diagram of a radar housing.

FIG. 3A is a block diagram of radar housing 102. Radar sensor 118 can be included in radar housing 102. In some examples, the radar sensor 118 can include memory 121 and processor 123.

The processor 123 provides processing functionality for the radar sensor 118 and can include any number of processors, micro-controllers, circuitry, field programmable gate array (FPGA) or other processing systems, and resident or external memory 121 for storing data, executable code, and other information. The processor 123 can execute one or more software programs embodied in a non-transitory computer readable medium (e.g., memory 121) that implement techniques described herein including receiving video data, comparing the video data to the detection of the number of vehicles by the radar sensor 118, and transmitting information to an indicator 106 based on the comparison. For example, if the radar returns and the video data both detect a vehicle, the information can be sent to the indicator 106 because the existence of the vehicle is verified. However, if the radar returns identifies a vehicle 122, but the image data does not, the radar sensor 118 may not send the information to the indicator 106 because it could be a false alert. The processor 123 is not limited by the materials from which it is formed or the processing mechanisms employed therein and, as such, can be implemented via semiconductor(s) and/or transistors (e.g., using electronic integrated circuit (IC) components), and so forth.

The memory 121 can be a tangible, computer-readable storage medium that provides storage functionality to store various data and/or program code associated with an operation, such as software programs and/or code segments, or other data to instruct the processor 123, and possibly other components of the radar sensor 118, to perform the functionality described herein. The memory 121 can store data, such as program instructions for operating the radar sensor 118 including its components, and so forth. The memory 121 can also store radar returns, video data, and the like.

It should be noted that while a single memory 121 is described, a wide variety of types and combinations of memory (e.g., tangible, non-transitory memory) can be employed. The memory 121 can be integral with the processor 123, can comprise stand-alone memory, or can be a combination of both. Some examples of the memory 121 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In a number of embodiments, the radar sensor 118 and/or the memory 121 can include removable integrated circuit card (ICC) memory, such as memory provided by a subscriber identity module (SIM) card, a universal subscriber identity module (USIM) card, a universal integrated circuit card (UICC), and so on.

The radar sensor 118 can further include a wireless interface 107 and an accelerometer 109. The wireless interface 107 can enable the radar sensor 118 to transmit data via Bluetooth, Wi-Fi, and/or a cellular network, for example. The radar sensor 118 can transmit data to other components of the motorcycle radar system 100 and/or devices external to the motorcycle radar system 100 via the wireless interface 107. In some examples, described below, radar sensor 118 is configured to use wireless interface 107 to transfer radar-related information to an electronic device, such as a smartphone, navigation device, head-up-display, helmet display, combinations thereof, and the like.

The accelerometer 109 can detect an angle of lean of a motorcycle. The accelerometer 109 may include a gyroscope and/or other inertial measurement devices to detect the lean, attitude, orientation, and/or other position of the motorcycle. When the motorcycle is leaned over, the radar sensor 118 may detect the ground and transmit a false alert that a vehicle is near the motorcycle. To prevent such false alerts, the accelerometer 109 can detect and transmit an angle of lean of the motorcycle to the radar sensor 118. The radar sensor 118 can ignore a radar return that may correspond to the ground to prevent the motorcycle radar system 100 from conveying a false alert to a rider when the motorcycle is within particular angle of lean ranges.

Figure 3B:
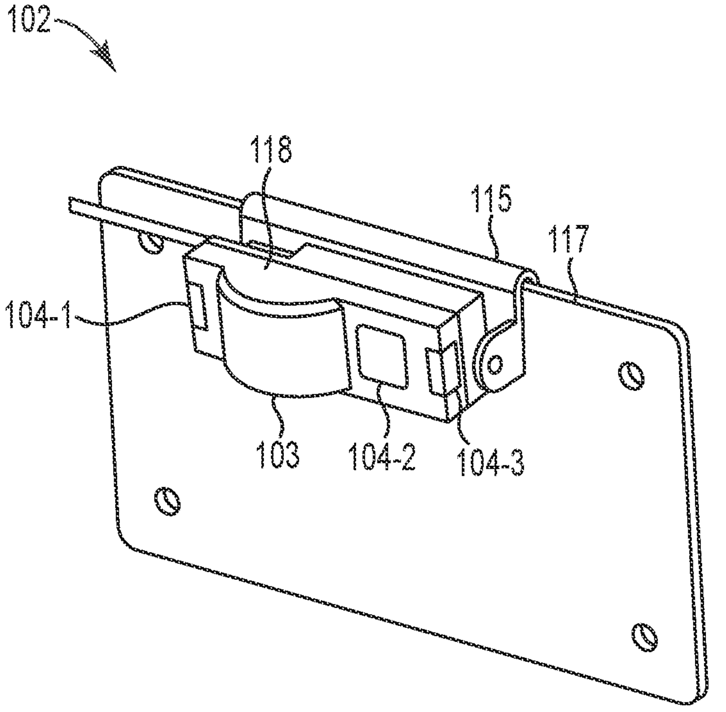
FIG. 3B is an isometric view of a radar housing coupled to a license plate.

FIG. 3B is an isometric view of a radar housing 102 coupled to a license plate 117. The radar housing 102 can include radar sensor 118, radar sensor cover 103, and a number of road lights 104-1, 104-2, 104-3. The radar housing 102 can be coupled to the license plate 117 or another portion of a motorcycle via an attachment device 115. The attachment device 115 can include a mounting bracket for installation behind a license plate of the motorcycle, as illustrated in FIG. 3B, for example. However, attachment device 115 can attach to other locations on the motorcycle and uses clips, ties, brackets, screws, and other mounting elements.

Figure 3C:
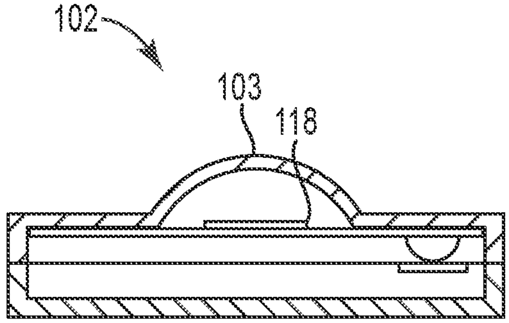
FIG. 3C is a cross section view of a radar housing including a radar sensor.
Figure 3D:
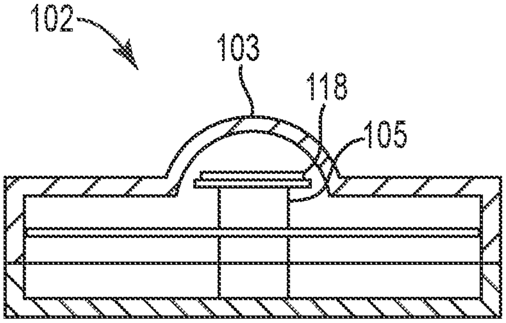
FIG. 3D is a cross section view of a radar housing including a radar sensor.

FIGS. 3C and 3D each illustrate a cross section view of a radar housing 102. The radar housing 102 can include radar sensor 118 and radar sensor cover 103. The radar sensor 118 can be a 76-81 GHz radar or any type of optical or radar device employing any frequency or electromagnetic band, including a 60 GHz band. For example, the radar sensor 118 can be a Texas Instruments "mmWave" Radar sensor IWR1843AOP configured for operation in the 76-81 GHz band. The radar sensor cover 103 can include a radome with a horizontal field of view (e.g., HFOV) of at least 150 degrees. In some examples, the radome has a HFOV of around 180 degrees. In a number of embodiment, the radome can be formed of a 50% glass filled nylon material. As illustrated in FIG. 3D, the radar sensor 118 can be on a raised thermal boss 105 to increase horizontal visibility of the radar sensor 118.

FIGS. 4A-4F are illustrations of a top view of a motorcycle 120, an area surrounding the motorcycle 120, and an example of a motorcycle radar system 100 including a number of road lights 104-1, 104-2, 104-3. The top view of the motorcycle 120 and the area surrounding the motorcycle 120 can illustrate a location of a vehicle 122 in relationship to the motorcycle 120 while the motorcycle radar system 100 shows the corresponding illumination of indicator lights 108-1, 108-2, 108-3, 108-4 and road lights 104-1, 104-2, 104-3 based on the location of the vehicle 122.

The motorcycle radar system 100 can include indicators 106-1, 106-2, the road lights 104-1, 104-2, 104-3, and a radar housing 102. The indicators 106-1, 106-2 can include the number of indicator lights 108-1, 108-2, 108-3, 108-4, a button 110, and a status light 112. When coupled to the motorcycle 120, the indicator lights 108-1, 108-2, 108-3, 108-4 and the status light 112 can emit light towards the rider of the motorcycle 120. In a number of embodiments, the number of indicator lights 108-1, 108-2, 108-3, 108-4 and the status light 112 can be coupled to a handlebar or a yoke of the motorcycle 120.

The radar housing 102 can include a radar sensor 118 that can transmit radar signals and receive radar returns to detect a number of vehicles, including vehicle 122, within a particular distance of the motorcycle 120. The received radar returns may be processed into radar data that can be utilized by the radar sensor 118, and/or other devices coupled with radar sensor 118 through the wireless interface 107, to determine the direction, location, type, and/or size of vehicle 122 based on the radar returns. The particular distance can include area 124-1 and area 124-2. One or more of the indicators 106-1, 106-2 can convey information to a rider of the motorcycle 120 based on the detection of vehicle 122. For example, the information conveyed by each indicator light of the number of indicator lights 108-1, 108-2, 108-3, 108-4 corresponds to a presence of the vehicle 122 within a particular area 124-1, 124-2 relative to the motorcycle 120.

Figure 4A:
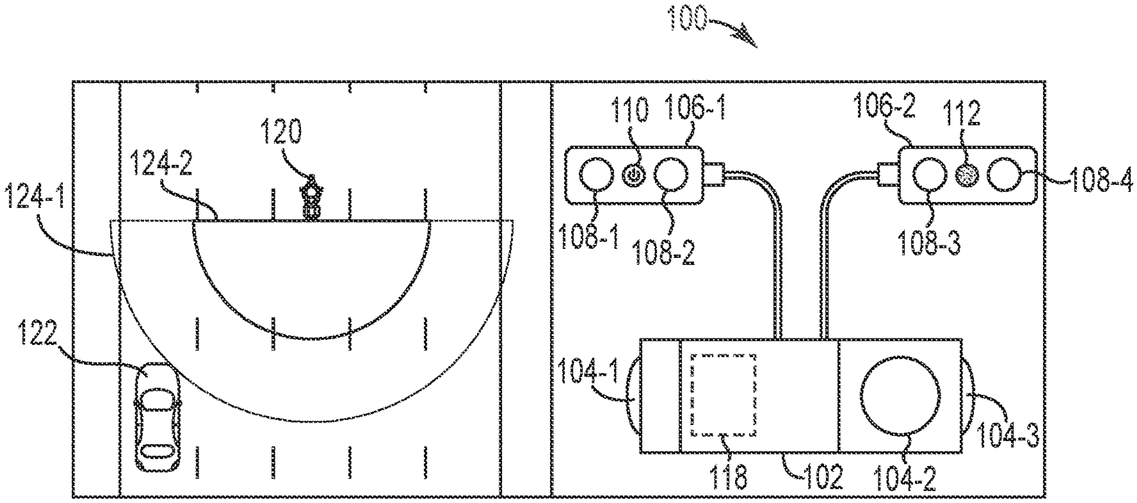
FIG. 4A is an illustration of a top view of a motorcycle and an area surrounding the motorcycle and an example of a motorcycle radar system including a number of road lights.

As illustrated in FIG. 4A, the vehicle 122 is outside of area 124-1 and area 124-2. As such, none of the indicator lights 108-1, 108-2, 108-3, 108-4 emit light. Similarly, none of road lights 104-1, 104-2, 104-3 emit light.

Figure 4B:
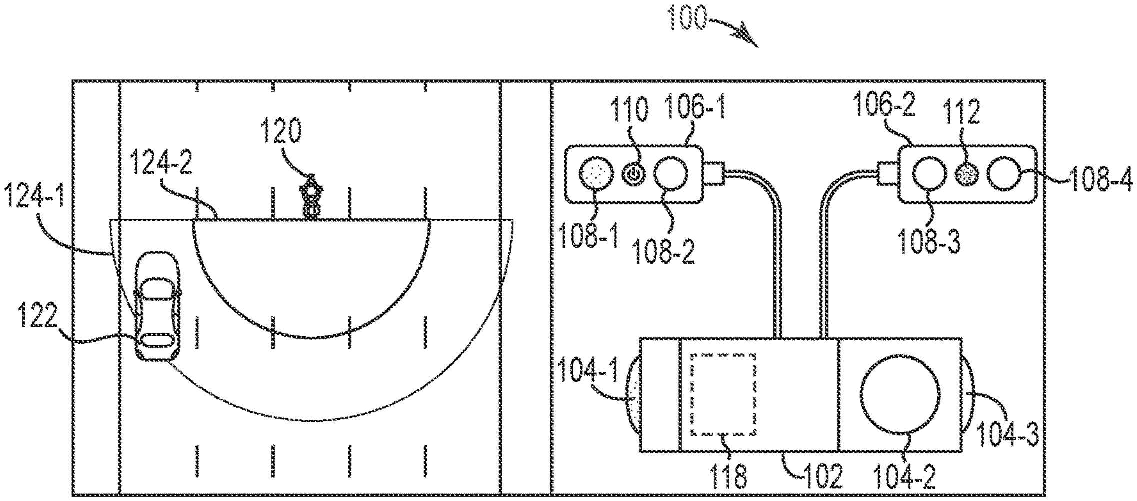
FIG. 4B is an illustration of a top view of a motorcycle and an area surrounding the motorcycle and an example of a motorcycle radar system including a number of road lights.

In FIG. 4B, a portion of the vehicle 122 is within area 124-1. In response to the portion of the vehicle 122 being within area 124-1 and on the left-side of motorcycle 120, indicator light 108-1 on the left indicator 106-1 emits light to signal to the rider the location of vehicle 122. Road light 104-1 on the left-side of the radar housing 102 can emit light in response to the portion of the vehicle 122 being within area 124-1 and on the left-side of motorcycle 120 to warn the driver of vehicle 122 of the presence of motorcycle 120. In some examples, the indicator light 108-1 and road light 104-1 can emit a yellow light.

Figure 4C:
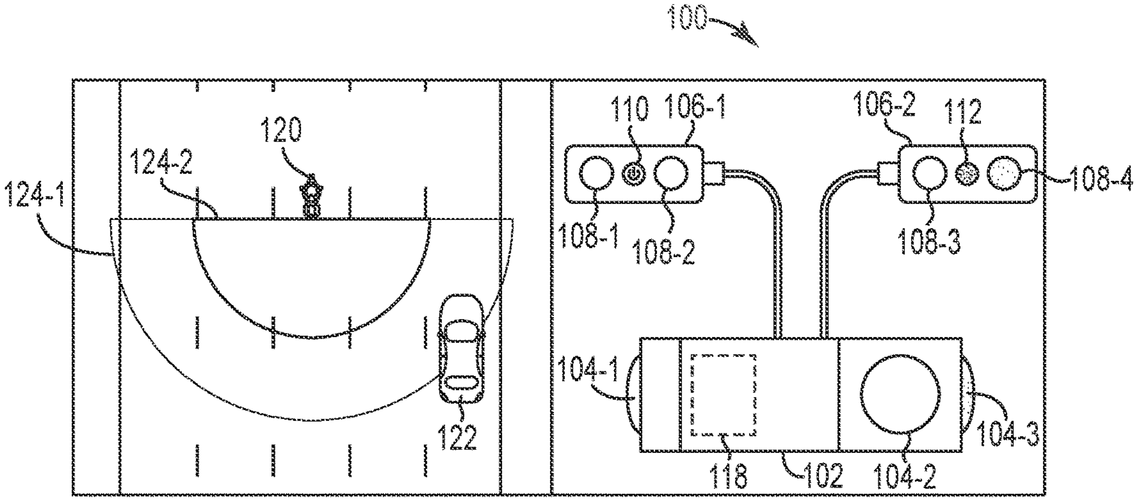
FIG. 4C is an illustration of a top view of a motorcycle and an area surrounding the motorcycle and an example of a motorcycle radar system including a number of road lights.

FIG. 4C illustrates a portion of the vehicle 122 being within area 124-1. In response to the portion of the vehicle 122 being within area 124-1 and on the right-side of motorcycle 120, indicator light 108-4 on the right indicator 106-2 emits light to signal to the rider the location of vehicle 122. Road light 104-3 on the right-side of the radar housing 102 can emit light in response to the portion of the vehicle 122 being within area 124-1 and on the right-side of motorcycle 120 to warn the driver of vehicle 122 of the presence of motorcycle 120. In some examples, the indicator light 108-4 and road light 104-3 can emit a yellow light.

Figure 4D:
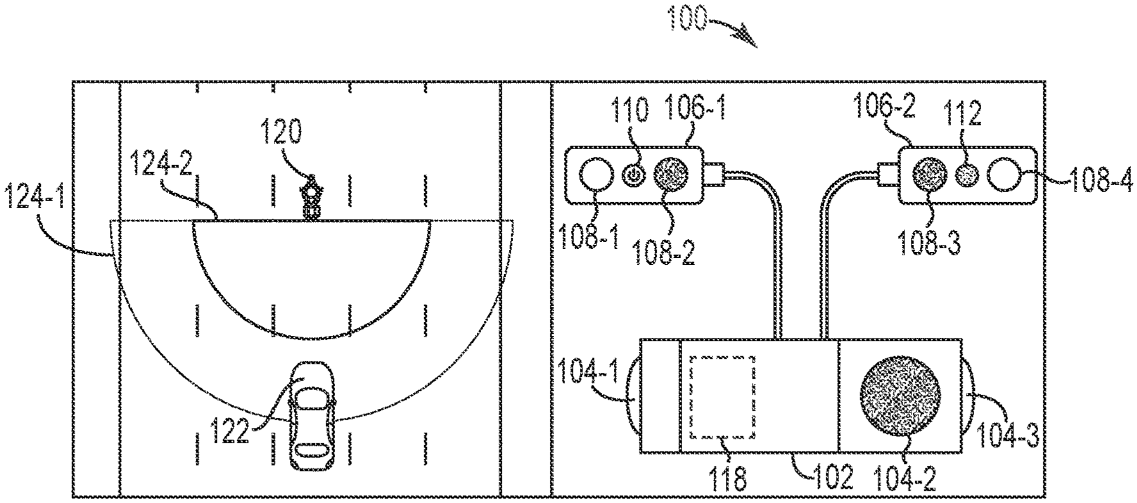
FIG. 4D is an illustration of a top view of a motorcycle and an area surrounding the motorcycle and an example of a motorcycle radar system including a number of road lights.

FIG. 4D illustrates a portion of vehicle 122 being within area 124-1. In response to the portion of the vehicle 122 being within area 124-1 and directly behind motorcycle 120, indicator lights 108-2, 108-3 emit light to signal to the rider the location of vehicle 122. Road light 104-2 can emit light in response to the portion of the vehicle 122 being within area 124-1 and directly behind motorcycle 120 to warn the driver of vehicle 122 of the presence of motorcycle 120. In some examples, the indicator lights 108-2, 108-3 and road light 104-2 can emit a red light. A red light can be associated with stopping and/or danger, while a yellow light can be associated with preparing to stop, slowing down, or using caution. Accordingly, one or more of the road lights 104-1, 104-2, 104-3 and/or one or more of the indicator lights 108-1, 108-2, 108-3, 108-4 may go from emitting a yellow light to a red light as vehicle 122 gets closer to the motorcycle 120.

Figure 4E:
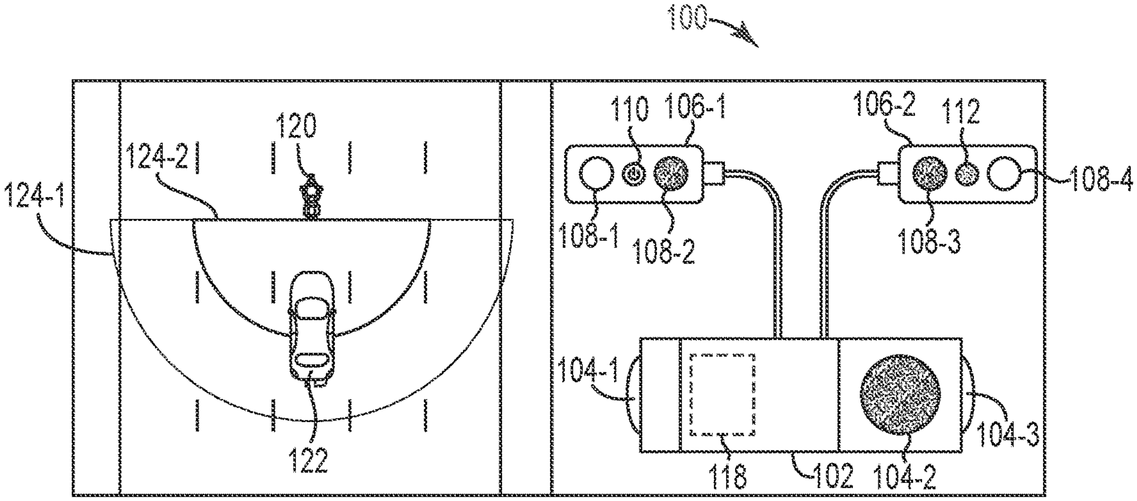
FIG. 4E is an illustration of a top view of a motorcycle and an area surrounding the motorcycle and an example of a motorcycle radar system including a number of road lights.

FIG. 4E illustrates a portion of vehicle 122 being within area 124-2. In response to the portion of the vehicle 122 being within area 124-2 and directly behind motorcycle 120, indicator lights 108-2, 108-3 emit light to signal to the rider the location of vehicle 122. The indicator lights 108-2, 108-3 can emit a red light. Road light 104-2 can emit light in response to the portion of the vehicle 122 being within area 124-2 and directly behind motorcycle 120 to warn the driver of vehicle 122 of the presence of motorcycle 120. In some examples, the indicator lights 108-2, 108-3 and/or road light 104-2 can flash or increase an intensity to show an elevated alert due to the proximity of the vehicle 122 to the motorcycle 120.

Figure 4F:
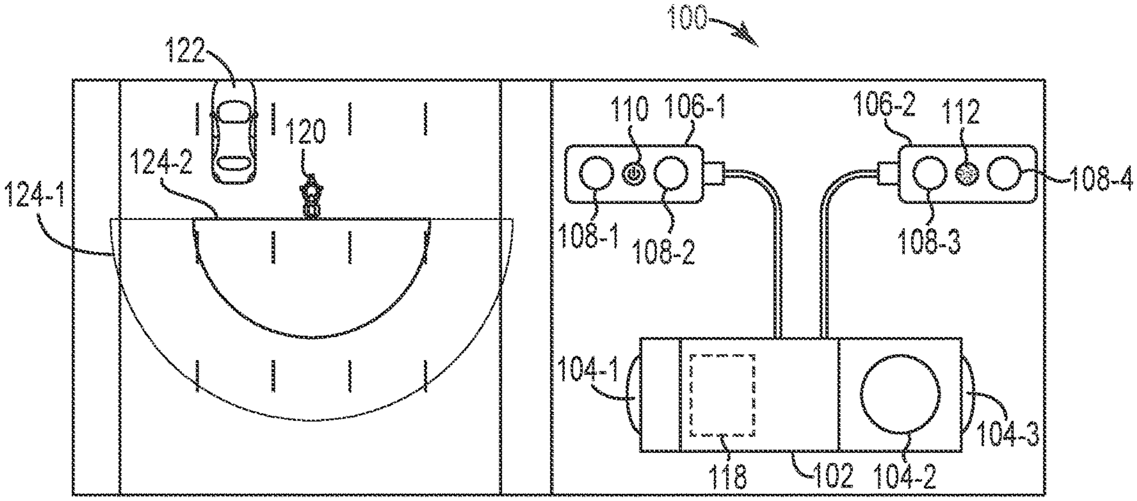
FIG. 4F is an illustration of a top view of a motorcycle and an area surrounding the motorcycle and an example of a motorcycle radar system including a number of road lights.

As illustrated in FIG. 4F, the vehicle 122 is outside of area 124-1 and area 124-2. For example, the vehicle 122 is not within the rider's blind spot. As such, none of the indicator lights 108-1, 108-2, 108-3, 108-4 emit light. Similarly, none of road lights 104-1, 104-2, 104-3 emit light. In some configurations, where the vehicle 122 is not within the rider's blind spot, but the rider is within a blind spot of the vehicle 122, system 100 can notify the rider of his or her position via illumination of one or more of the indicator lights 108.

Figure 5:
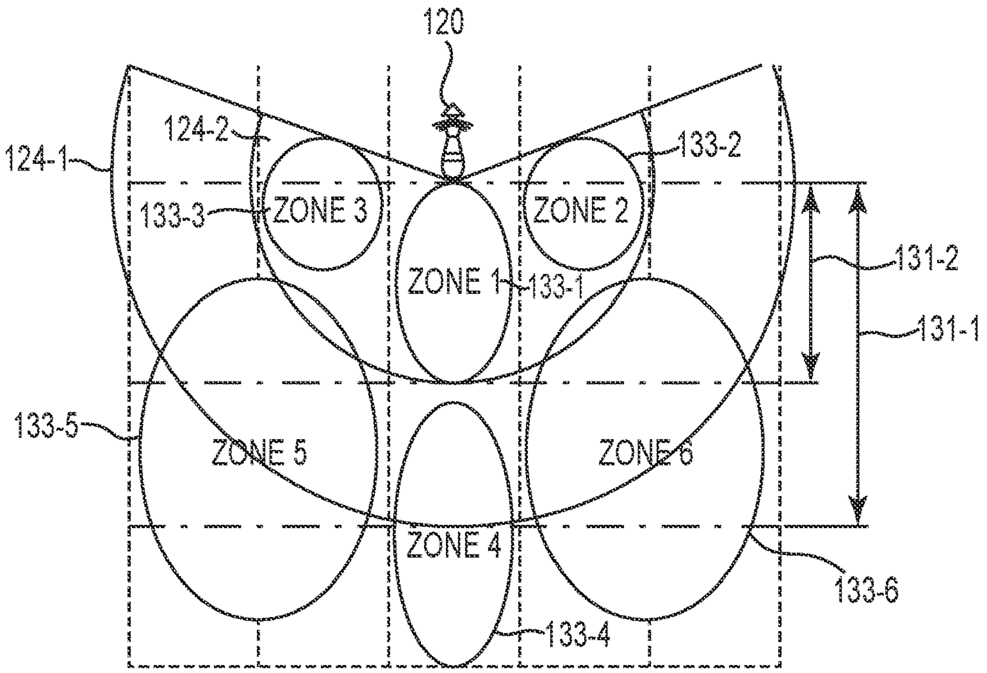
FIG. 5 is an illustration of a top view of a motorcycle and an area surrounding the motorcycle including a number of zones.

FIG. 5 is an illustration of a top view of a motorcycle 120 and an area surrounding the motorcycle 120 including a number of zones 133-1, 133-2, 133-3, 133-4, 133-5, 133-6. A motorcycle radar system 100 can notify a rider of the motorcycle 120 when a vehicle 122 is in any of the number of zones 133-1, 133-2, 133-3, 133-4, 133-5, 133-6. Area 124-1 can include zone 4 133-4, zone 5 133-5, and zone 6 133-6 and area 124-2 can include zone 1 133-1, zone 2 133-2, and zone 3 133-3. Area 124-1 can be an area within a first distance 131-1 from motorcycle 120 and area 124-2 can be an area within a second distance 131-2 from motorcycle 120. In some examples, the first distance 131-1 can be 8 meters and the second distance 131-2 can be 4 meters.

As illustrated in FIGS. 4A-4E, indicator light 108-1 and road light 104-1 can turn on (e.g., emit light) when a vehicle 122 is in zone 3 133-3 or zone 5 133-5, indicator light 108-2, indicator light 108-3, and road light 104-2 can emit light when a vehicle 122 is in zone 1 133-1 or zone 4 133-4, and indicator light 108-4 and road light 104-3 can emit light when a vehicle 122 is in zone 2 133-2 or zone 6 133-6.

Figure 6:
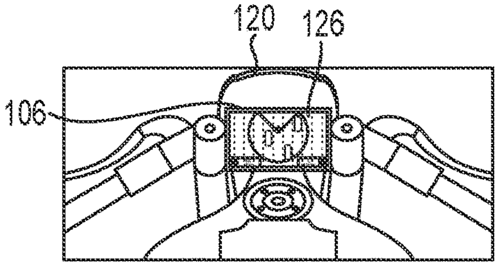
FIG. 6 is an example of an indicator coupled to a motorcycle.

FIG. 6 is an example of an indicator 106 coupled to a motorcycle 120. As illustrated in FIG. 6, the indicator 106 can be a computing device. For example, the indicator 106 can be a smartphone and/or a navigation device that can be paired to the radar sensor 118 and present enhanced alert information to a rider of the motorcycle 120. Although not illustrated, the indicator 106 can include a processor and a memory. The processor provides processing functionality for the indicator 106 and can include any number of processors, micro-controllers, circuitry, FPGA or other processing systems, and resident or external memory for storing data, executable code, and other information. The processor can execute one or more software programs embodied in memory that implement techniques described herein including conveying information to a rider of the motorcycle 120. The processor is not limited by the materials from which it is formed or the processing mechanisms employed therein and, as such, can be implemented via semiconductor(s) and/or transistors, and so forth.

The one or more processors may be adapted and configured to execute any of a number of software applications and/or any of a number of software routines residing in memory, in addition to other software applications. One of the number of applications may be a client application that may be implemented as a series of machine-readable instructions for performing the various functions associated with implementing the performance of the motorcycle radar system 100 as well as receiving information at, displaying information on, and transmitting information from the indicator 106. The client application may function to implement a system wherein the front-end components communicate and cooperate with back-end components. The client application may include machine-readable instructions for implementing a user interface on a display 126 to allow a user to input commands to, and receive information from, the indicator 106. Display 126 may be associated with a navigation device, a smartphone, a smartwatch, a wearable device, a discrete electronic display, a helmet-mounted display, a head-up display, combinations thereof, or the like.

One of the plurality of applications may be a native web browser, such as Apple's Safari®, Google Android™ mobile web browser, Microsoft Internet Explorer® for Mobile, Opera Mobile™, that may be implemented as a series of machine-readable instructions for receiving, interpreting, and displaying web page information from a server device or other back-end components while also receiving inputs from the indicator 106. Another application of the plurality of applications may include an embedded web browser that may be implemented as a series of machine-readable instructions for receiving, interpreting, and displaying web page information from the server device or other back-end components within the client application.

Figure 7A:
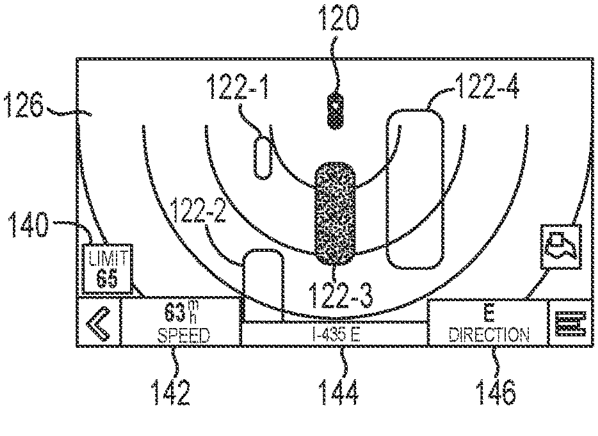
FIG. 7A is an example of a display conveying information to a rider of a motorcycle.
Figure 7B:
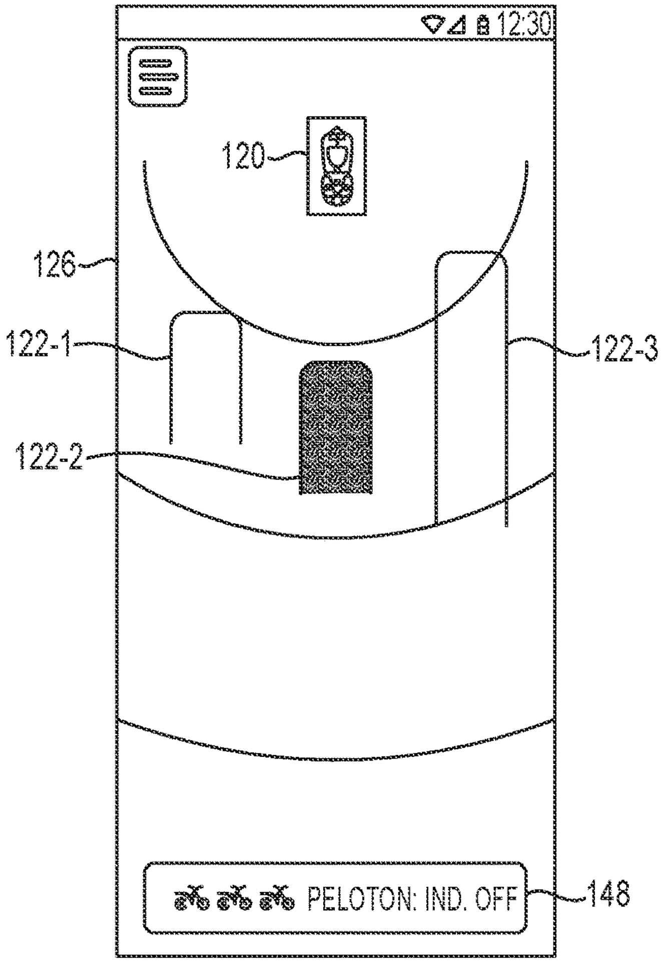
FIG. 7B is an example of a display conveying information to a rider of a motorcycle.
Figure 7C:
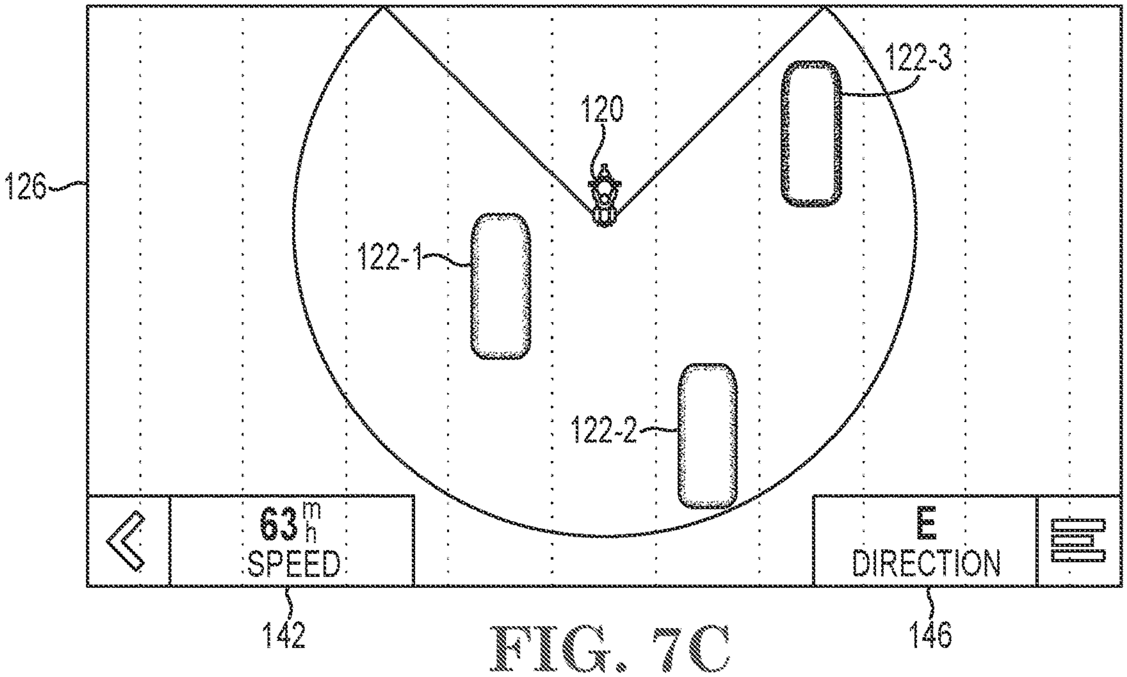
FIG. 7C is an example of a display conveying information to a rider of a motorcycle.

FIGS. 7A-7C are examples of a display 126 conveying information to a rider of a motorcycle 120. Display 126 can be communicatively coupled to radar sensor 118, such through wireless interface 107, and the information conveyed to the rider of the motorcycle 120 can be based on the detection of a number of vehicles 122-1, 122-2, 122-3, 122-4. Display 126 can include a graphic representing a top view of motorcycle 120 and a particular area surrounding the motorcycle 120. In some examples, the particular area surrounding the motorcycle 120 may include locations and/ or sizes of a number of vehicles 122-1, 122-2, 122-3, 122-4 relative to the motorcycle 120.

In addition to the top view that shows the motorcycle 120 and the positions of nearby vehicles 122, the motorcycle radar system 100 can offer alternative visual perspectives to provide situational awareness for the rider. One such view is the rear-view perspective, which focuses on the area behind the motorcycle 120. This perspective utilizes the radar sensor 118 and possibly camera 119 to monitor vehicles 122 approaching from the rear, displaying them on display 126 in varying colors or intensities based on their relative speed and distance to highlight those closer or approaching more rapidly.

Another view is the lateral perspective, which emphasizes the zones to the left and right of the motorcycle 120, corresponding to traditional blind spots. This view leverages data from the radar sensor 118 to provide a visual representation of vehicles 122 in these areas on display 126, potentially aiding in safer lane changes by showing the movement of vehicles adjacent to the motorcycle 120.

Additionally, a forward-view perspective can be provided, focusing on the area in front of the motorcycle 120. Utilizing both the radar sensor 118 and camera 119, this view can be useful in congested traffic conditions or when navigating complex road environments, highlighting vehicles 122 that are decelerating or coming to a stop on display 126, thus allowing the rider to adjust speed to maintain a safe following distance.

These alternative views can be selectively presented on the display 126 based on riding context or rider preference. The system 100 can automatically switch between views depending on detected traffic conditions or rider actions, such as activating a turn signal or applying brakes, to ensure relevant information is always presented. Riders may also have the option to manually select their preferred view for continuous monitoring or switch between views as needed to fully understand the surrounding traffic environment.

As described above, in some examples, display 126 may be associated with a smartphone app running on a smartphone paired to system 100 or with a navigation device mounted to motorcycle 120. Real-time visual information from camera 119 may additional be presented by display 126 in combination with alert and vehicle information. For example, display 126 may present a "birds-eye" view of the environment surrounding the motorcycle 120, with augmented radar information concerning vehicles 122 (speed, distance, etc.) and associated alert information. Such a configuration enables the rider to receive a visual identification of nearby traffic in addition to the radar-based information associated with such traffic.

If the motorcycle 120 is one of a number of motorcycles riding together in a group (e.g., a peloton), the display 126 can include a peloton indicator 148 to convey to the rider whether the display 126 is showing or not showing other motorcycles riding in close proximity to the motorcycle 120.

The particular area surrounding the motorcycle 120 can further include lane lines relative to the motorcycle 120. The lane lines can be determined based on image data from camera 119, as previously discussed. Additional alerts may be generated and conveyed to the rider of the motorcycle 120 via display 126 if one of the number of vehicles 122-1, 122-2, 122-3, 122-4 cross a lane line towards the motorcycle 120 or otherwise maneuvers towards the motorcycle 120. In a number of embodiments, the vehicle of the number of vehicles 122-1, 122-2, 122-3, 122-4 maneuvering towards the motorcycle 120 can flash colors or turn a particular color on display 126.

In some examples, the size (e.g., length and/or width), relative speed, and position of nearby vehicles 122-1, 122-2, 122-3, 122-4 can be displayed to the rider. As illustrated in FIG. 7A, vehicle 122-1 is smaller than vehicle 122-3, which is smaller than vehicle 122-4. In some examples, vehicle 122-1 can be a motorcycle, vehicle 122-2 and vehicle 122-3 can be cars, while vehicle 122-4 can be a truck.

In a number of embodiments, one or more of the number of vehicles 122-1, 122-2, 122-3, 122-4 moving towards (e.g., closing in on) the motorcycle 120 may be presented in a first color while one or more of the number of vehicles 122-1, 122-2, 122-3, 122-4 that match the speed of the motorcycle 120 may be presented in a second color. For example, vehicle 122-3 in FIG. 7A and vehicle 122-2 in FIG. 7B are presented in the second color because they are moving towards the motorcycle 120, while vehicle 122-1, vehicle 122-2, and vehicle 122-4 in FIG. 7A and vehicle 122-1 and vehicle 122-3 in FIG. 7B are in the first color because they are moving the same speed as motorcycle 120.

In some examples, the system 100, including the smartphone application described above, may use predictive analytics to forecast potential path deviations of nearby vehicles 122-1, 122-2, 122-3, 122-4, offering anticipatory alerts to the rider. Using historical data for each of the vehicles, such as previous speed and position, and changes in that speed and position, the system 100 can predict if one of the vehicles 122 is on a forecasted path that presents risk to the rider. System 100 may integrate data from the radar 118 and camera 119 to build a predictive model for each nearby vehicle to assist in generating predictive alerts.

In some example, system 100 may use V2X (Vehicle-to-Everything) technology, allowing the motorcycle 120 and surrounding vehicles 122-1, 122-2, 122-3, 122-4 to exchange information about their speed, direction, and intended maneuvers. This enables the display 126 to not only show the current state but also predict and illustrate future positions of nearby vehicles, enhancing the rider's ability to make informed decisions.

Additional information can be conveyed to the rider of the motorcycle 120 via display 126. For example, the display 126 can also present a speed limit 140, a speed 142 of the motorcycle 120, a road or highway 144 the motorcycle 120 is currently on, and/or a direction 146 in which the motorcycle 120 is traveling. The system 100 can be integrated with smart helmets, offering visual or auditory alerts via indicators 106-1, 106-2 directly to riders instead of, or in addition to, relying on indicators physically positioned on the motorcycle 120. The system 100 can also be integrated with an integrated lighting system of the motorcycle 120, such as its brake lights and turn signals, to automatically adjust those lights in combination with road lights 104 to enhance visibility of the motorcycle 120. The system 100 can communicate with other similar systems, such as through the smartphone interface described above or directly using integrated radio communication functionality, to share traffic and rider information with other users. For example, for group riders, position, speed, and location information may be shared among the group to expand the number of targets (vehicles) tracked by each system 100 and presented to the rider.

System 100 may include or be utilized in combination with augmented reality (AR) and head-up display (HUD) systems that may be integrated into the rider's helmet or the motorcycle 120 itself. Such integration allows the size, speed, and directional data of nearby vehicles 122-1, 122-2, 122-3, 122-4 to be easily presented to the rider without requiring the use of an external smartphone or electronic display.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

As used herein, "a number of" something can refer to one or more of such things. As will be appreciated, elements shown in the various embodiments herein can be added, exchanged, and/or eliminated so as to provide a number of additional embodiments of the present disclosure.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A motorcycle radar system, comprising:
- a housing configured to detachably couple to a motorcycle, the housing retaining:
  - a radar sensor configured to:
    - transmit and receive radar signals; and
    - process the received radar signals to generate radar data corresponding to one or more vehicles proximate the motorcycle;
  - a wireless interface coupled with the radar sensor, the wireless interface configured to transmit the generated radar data to an external display device; and
  - a plurality of discrete light emitters communicatively coupled to the radar sensor, the plurality of discrete light emitters including:
    - a first light emitter positioned to emit light outwardly in a rearward direction relative to the motorcycle; and
    - a second light emitter and a third light emitter each positioned to emit light outwardly in respective directions angled relative to the rearward direction and oriented toward opposite sides of the motorcycle;
    - wherein the plurality of discrete light emitters are configured to selectively emit light based on the radar data corresponding to the one or more vehicles; and
- two or more indicators physically separate from the housing and communicatively coupled to the radar sensor, each of the two or more indicators including one or more indicator lights configured to selectively emit light based on the radar data, wherein the two or more indicators are configured to removably couple to the motorcycle such that the one or more indicator lights emit light toward a rider of the motorcycle, and wherein each of the one or more indicator lights is selectively activated based on a relative position of at least one vehicle with respect to the motorcycle.

2. The system of claim 1, wherein the radar sensor is configured to determine a relative speed, direction, and/or size of one or more of the vehicles based on the received radar data.

3. The system of claim 2, wherein the external display device comprises at least one processor and a display, the at least one processor configured to present a top view including a graphical representation of the motorcycle and the one or more vehicles proximate the motorcycle based on the radar data.

4. The system of claim 1, wherein the plurality of discrete light emitters are configured to selectively emit light based on the number of vehicles proximate the motorcycle.

5. The system of claim 4, wherein the first light emitter is configured to emit a first color, and the second light emitter and third light emitter are each configured to emit a second color different from the first color.

6. The system of claim 1, further including a camera configured for attachment to the motorcycle and communicatively coupled to the radar sensor, wherein the camera is configured to generate and transmit video data.

7. The system of claim 6, wherein the radar sensor is configured to receive the video data and compare the video data to the radar data.

8. The system of claim 3, wherein the top view includes a location of a lane line relative to the motorcycle.

9. The system of claim 1, wherein the external display device is selected from the group consisting of a navigation device, a smartphone, a smartwatch, a wearable device, a display, a helmet-mounted display, and a head-up display.

10. The system of claim 1, wherein the housing includes a radome with a horizontal field of view of at least 150 degrees.

11. The system of claim 1, wherein at least one of the plurality of discrete light emitters and one or more of the indicator lights are activated based on the radar data.

12. A motorcycle radar system, comprising:
- a housing configured to detachably couple to a motorcycle, the housing retaining:
  - a radar sensor configured to:
    - transmit and receive radar signals; and
    - process the received radar signals to generate radar data corresponding to one or more vehicles proximate the motorcycle;
  - a wireless interface coupled with the radar sensor, the wireless interface configured to transmit the generated radar data to an external display device;
  - a radome with a horizontal field of view of at least 150 degrees; and
  - a plurality of discrete light emitters communicatively coupled to the radar sensor, the plurality of discrete light emitters including:
    - a first light emitter positioned to emit light outwardly in a rearward direction relative to the motorcycle; and
    - a second light emitter and a third light emitter each positioned to emit light outwardly in respective directions angled relative to the rearward direction and oriented toward opposite sides of the motorcycle;

wherein the plurality of discrete light emitters are configured to selectively emit light based on the radar data corresponding to the one or more vehicles.

* * * * *